United States Patent
Takesue

(10) Patent No.: US 8,022,141 B2
(45) Date of Patent: Sep. 20, 2011

(54) GOLF BALL AND METHOD OF MANUFACTURE

(75) Inventor: Rinya Takesue, Tokyo (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 308 days.

(21) Appl. No.: 12/426,683

(22) Filed: Apr. 20, 2009

(65) Prior Publication Data

US 2009/0203841 A1 Aug. 13, 2009

Related U.S. Application Data

(62) Division of application No. 11/265,255, filed on Nov. 3, 2005, now Pat. No. 7,550,535.

(51) Int. Cl.
*A63B 37/12* (2006.01)
*A63B 37/00* (2006.01)
*C08L 33/02* (2006.01)

(52) U.S. Cl. ........ 525/125; 525/127; 525/130; 473/373; 473/374; 473/378; 473/385

(58) Field of Classification Search ........................ None
See application file for complete search history.

(56) References Cited

U.S. PATENT DOCUMENTS

| | | |
|---|---|---|
| 3,395,109 A | 7/1968 | Molitor et al. |
| 4,248,432 A | 2/1981 | Hewitt et al. |
| 4,442,282 A | 4/1984 | Kolycheck |
| 4,674,751 A | 6/1987 | Molitor et al. |
| 5,298,511 A | 3/1994 | Waterson |
| 6,565,456 B2 * | 5/2003 | Hayashi et al. ............... 473/373 |
| 6,761,648 B2 | 7/2004 | Takesue et al. |
| 6,822,028 B2 | 11/2004 | Takesue et al. |
| 7,037,963 B2 | 5/2006 | Takesue et al. |
| 2002/0099120 A1 | 7/2002 | Takesue et al. |
| 2004/0106471 A1 | 6/2004 | Hayashi et al. |

FOREIGN PATENT DOCUMENTS

| | | |
|---|---|---|
| JP | 2003-339910 A | 12/2003 |
| JP | 2004-180725 A | 7/2004 |

* cited by examiner

*Primary Examiner* — David Buttner
(74) *Attorney, Agent, or Firm* — Sughrue Mion, PLLC

(57) ABSTRACT

In a golf ball composed of a core and a cover having a plurality of layers that encloses the core, at least a first layer of the cover is formed primarily of a heated mixture of (A) a metal ion neutralization product of an olefin-unsaturated carboxylic acid copolymer and/or a metal ion neutralization product of an olefin-unsaturated carboxylic acid-unsaturated carboxylic acid ester copolymer, (B) at least one type of olefin-unsaturated carboxylic acid copolymer and/or olefin-unsaturated carboxylic acid-unsaturated carboxylic acid ester copolymer having the same content of unsaturated carboxylic acid as component A, and (C) a thermoplastic polyurethane elastomer; and at least one other cover layer adjoining the at least first cover layer is formed primarily of a non-ionomeric thermoplastic elastomer. Because the golf ball is made using a cover stock having a good heat resistance, good moldability, good paint film adhesion and good adhesion to adjoining layers, it has an excellent rebound, an excellent feel when hit, and is more resistant to a decline in durability to impact.

4 Claims, 1 Drawing Sheet

GOLF BALL AND METHOD OF MANUFACTURE

Figure 1:
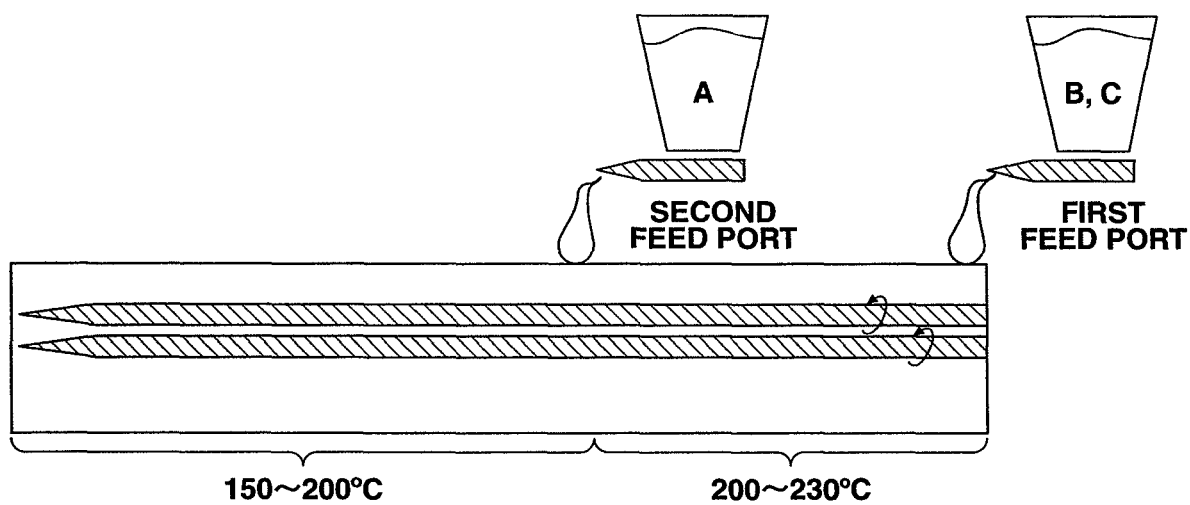

The present application is a Divisional of U.S. application Ser. No. 11/265,255 filed Nov. 3, 2005 now U.S. Pat. No. 7,550,535. The entire disclosures of the aforementioned prior applications are hereby incorporated by reference in their entirety.

BACKGROUND OF THE INVENTION

The present invention relates to golf balls made using a polyurethane/ionomer resin blend which has a good heat resistance, good moldability, good paint film adhesion and good adhesion to adjoining layers, and from which can be obtained high-performance golf balls endowed with an excellent rebound and excellent feel on impact. The invention relates also to a method of manufacturing such golf balls.

Wide use has hitherto been made of ionomer resins in golf ball cover stock compositions. Ionomer resins are ionic copolymers composed of an olefin such as ethylene in combination with a metal salt of an unsaturated carboxylic acid such as acrylic acid, methacrylic acid or maleic acid. The acid groups in the copolymer are partially neutralized with metal ions such as sodium or zinc ions. These resins have excellent characteristics such as durability and rebound, and are suitable as the base resin in golf ball cover stock.

When an ionomer resin is used as the cover stock in a golf ball, the cover of the ball is very hard and lacks a flexibility sufficient to impart the spin rate necessary for controlling the ball in flight. Moreover, golf balls that are made using a hard ionomer resin as the cover stock have a poor "feel" at the time of impact.

To overcome such drawbacks of ionomer resins, cover stocks using thermoplastic polyurethane elastomers were proposed in U.S. Pat. No. 3,395,109, U.S. Pat. No. 4,248,432, and U.S. Pat. No. 4,442,282. Cover stocks using thermoplastic polyurethane elastomers provide a better feel when the ball is played and better controllability than do cover stocks made with ionomer resins.

More recently, U.S. Pat. No. 4,674,751 teaches a cover stock which is composed of a blend of an ionomer resin with a polyurethane elastomer and which provides a good compromise between the resilience of an ionomer resin-based cover stock and the feel of a polyurethane elastomer-based cover stock.

However, the ionomer resin and the polyurethane elastomer are of such a nature as to form chemical bonds when mixed under heating. When the cover stock composition is kept hot within a processing apparatus, it undergoes gelation and becomes impossible to mold, which is impractical.

I earlier found that adding an organic or inorganic basic compound to the polyurethane/ionomer resin blend is highly effective for preventing the polyurethane/ionomer resin blend from gelling when kept hot, and thus disclosed the golf ball material described in U.S. Pat. No. 6,822,028. This golf ball material does not gel during molding, and golf balls manufactured using the material exhibit a good rebound energy.

However, when such a golf ball material is used, because it contains organic bases such as amines that have a corrosive effect on the mold used to manufacture the golf ball, it leaves something to be desired in terms of the molding conditions and, depending on the equipment used, in terms of safety.

Also, because most such organic bases are low-melting aliphatic amines, they readily migrate to the surface of the molded article, compromising adhesion with adjoining layers and thus lowering the durability of the golf ball to impact. Paint film adhesion also is less than satisfactory.

SUMMARY OF THE INVENTION

The object of the invention is to provide a golf ball made using as the cover stock a polyurethane/ionomer resin blend which has a good heat resistance, good moldability, good paint film adhesion and good adhesion to adjoining layers, and from which can be obtained high-performance golf balls endowed with an excellent rebound and excellent feel on impact. The invention relates also to a method of manufacturing such golf balls.

As a result of extensive investigations, I have found that, in golf balls which are composed of a core and a cover made of a plurality of layers that encloses the core, a cover stock formed primarily of a heated mixture containing components A, B and C described below in specific respective amounts has excellent heat resistance, moldability and paint film adhesion. Moreover, when a first cover layer is formed of this cover stock, and another cover layer adjoining the first cover layer is formed primarily of a non-ionomeric thermoplastic elastomer, adhesion between the two cover layers is good, giving the ball an excellent rebound and an excellent feel when played and improving the durability of the ball to impact.

Accordingly, the invention provides the following golf balls.

[1] A golf ball composed of a core and a cover having a plurality of layers that encloses the core, the ball being characterized in that at least a first layer of the cover is formed primarily of a heated mixture of (A) 60 to 90 wt % of a metal ion neutralization product of an olefin-unsaturated carboxylic acid copolymer and/or a metal ion neutralization product of an olefin-unsaturated carboxylic acid-unsaturated carboxylic acid ester copolymer (40 to 80 wt % of component A being an ionomer neutralized with alkali metal ions), (B) 5 to 20 wt % of at least one type of olefin-unsaturated carboxylic acid copolymer and/or olefin-unsaturated carboxylic acid-unsaturated carboxylic acid ester copolymer, and (C) 2 to 30 wt % of a thermoplastic polyurethane elastomer; wherein at least one other cover layer adjoining the at least first cover layer is formed primarily of a non-ionomeric thermoplastic elastomer.

[2] The golf ball of [1] above, wherein the alkali metal ions in component A are sodium ions.

[3] The golf ball of [1] above, wherein component B has the same content of unsaturated carboxylic acid as component A.

[4] The golf ball of [1] above, wherein the at least one other cover layer is formed primarily of a polyurethane elastomer.

[5] The golf ball of [1] above, wherein the at least one other cover layer is formed primarily of a polyester elastomer.

[6] The golf ball of [1] above, wherein the polyurethane elastomer has added thereto an isocyanate mixture.

[7] A method of manufacturing a golf ball composed of a core and a cover having a plurality of layers that encloses the core, at least a first layer of the cover being formed primarily of a heated mixture of:

(A) 60 to 90 wt % of a metal ion neutralization product of an olefin-unsaturated carboxylic acid copolymer and/or a metal ion neutralization product of an olefin-unsaturated carboxylic acid-unsaturated carboxylic acid ester copolymer (40 to 80 wt % of component A being an ionomer neutralized with alkali metal ions), (B) 5 to 20 wt % of at least one type of olefin-unsaturated carboxylic acid copolymer and/or olefin-unsaturated carboxylic acid-unsaturated carboxylic acid ester copolymer having the same unsaturated carboxylic acid content as component A, and (C) 2 to 30 wt % of a thermoplastic polyurethane elastomer, which method includes pre-mixing component B and component C, and subsequently adding component A.

[8] The golf ball manufacturing method of [7] above, wherein components B and C are mixed at a temperature that is set higher than the temperature in the subsequent addition of component A.

[9] The golf ball manufacturing method of [7] above, wherein a twin-screw extruder is used during preparation of the heated mixture and the heated mixture is obtained by charging components B and C at a first feed port on the extruder, then adding component A at a second feed port.

[10] The golf ball manufacturing method of [7] above, wherein a zone which extends from the first feed port to just short of the second feed port has a maximum temperature setting of 200 to 230° C., and a zone which extends from the second feed port to a discharge opening has a maximum temperature setting of 150 to 200° C.

BRIEF DESCRIPTION OF THE DIAGRAMS

FIG. 1 is a schematic cross-sectional view of an example of a twin-screw extruder that may be used in the inventive method of manufacturing golf balls.

DETAILED DESCRIPTION OF THE INVENTION

The invention is described more fully below.

The golf ball material of the invention includes, as component A, a metal ion neutralization product of an olefin-unsaturated carboxylic acid copolymer and/or an olefin-unsaturated carboxylic acid-unsaturated carboxylic acid ester copolymer.

The olefin in component A is preferably one having generally at least 2 carbons, but not more than 8 carbons, and especially not more than 6 carbons. Specific examples include ethylene, propylene, butene, pentene, hexene, heptene and octene. Ethylene is especially preferred.

The unsaturated carboxylic acid is exemplified by acrylic acid, methacrylic acid, maleic acid and fumaric acid. Acrylic acid and methacrylic acid are especially preferred.

The unsaturated carboxylic acid ester is preferably a lower alkyl ester of the foregoing unsaturated carboxylic acid. Specific examples include methyl methacrylate, ethyl methacrylate, propyl methacrylate, butyl methacrylate, methyl acrylate, ethyl acrylate, propyl acrylate and butyl acrylate. Butyl acrylates (n-butyl acrylate, i-butyl acrylate) are especially preferred.

The copolymer in component A of the invention can be obtained by random copolymerization of the foregoing components by a known method. Here, it is recommended that the unsaturated carboxylic acid content (acid content) within the olefin-unsaturated carboxylic acid copolymer of above component A be generally at least 4 wt % ("wt %" is used here and below to mean percent by weight), preferably at least 6 wt %, more preferably at least 8 wt %, and even more preferably at least 10 wt %, but not more than 30 wt %, preferably not more than 20 wt %, more preferably not more than 18 wt %, and most preferably not more than 15 wt %. A low acid content may lower the resilience, whereas a high acid content may lower the processability. It is recommended that the unsaturated carboxylic acid content (acid content) within the olefin-unsaturated carboxylic acid-unsaturated carboxylic acid ester copolymer of above component A be generally at least 4 wt %, preferably at least 6 wt %, and more preferably at least 8 wt %, but not more than 15 wt %, preferably not more than 12 wt %, and even more preferably not more than 10 wt %. A low acid content may lower the resilience, whereas a high acid content may lower the processability.

The metal ion neutralization products of the foregoing copolymers can be obtained by partially neutralizing acid groups on the above-described olefin-unsaturated carboxylic acid (-unsaturated carboxylic acid ester) copolymer with metal ions. Examples of the metal ions which may be used to neutralize the acid groups include $Na^+$, $K^+$, $Li^+$, $Zn^{2+}$, $Cu^{2+}$, $Mg^{2+}$, $Ca^{2+}$, $Co^{2+}$, $Ni^{2+}$ and $Pb^{2+}$. Especially preferred examples include $Na^+$, $Li^+$, $Zn^{2+}$, $Mg^{2+}$ and $Ca^{2+}$. Such neutralization products can be obtained by a known method. For example, the neutralization products can be obtained by using such compounds as the formates, acetates, nitrates, carbonates, hydrogen carbonate, oxides, hydroxides or alkoxides of these metal ions.

Specific examples of metal neutralization products of olefin-unsaturated carboxylic acid copolymers that may be used as above component A include Himilan 1554, Himilan 1557, Himilan 1601, Himilan 1605, Himilan 1706, Himilan AM731 (all products of DuPont-Mitsui Polychemicals Co., Ltd.), and Surlyn 7930 (a product of E.I. du Pont de Nemours & Co.). Specific examples of the metal neutralization products of olefin-unsaturated carboxylic acid-unsaturated carboxylic acid ester copolymers that may be used as above component A include Himilan 1855, Himilan 1856 and Himilan AM7316 (all products of DuPont-Mitsui Polychemicals Co., Ltd.), Surlyn 6320, Surlyn 8320, Surlyn 9320 and Surlyn 8120 (all products of E.I. du Pont de Nemours & Co.), and Iotek 7510 and Iotek 7520 (both products of Exxon-Mobil Chemical).

In component A, the metal neutralization product of the olefin-unsaturated carboxylic acid (-unsaturated carboxylic acid ester) copolymer may be used alone or a plurality of components may be used together in admixture. The mixing ratio (parts by weight) of the metal neutralization product of olefin-unsaturated carboxylic acid and the metal neutralization product of olefin-unsaturated carboxylic acid-unsaturated carboxylic acid ester is from 100:0 to 25:75, preferably from 100:0 to 50:50, more preferably from 100:0 to 75:25, and most preferably 100:0. At a mixing ratio for the metal neutralization product of the olefin-unsaturated carboxylic acid copolymer of less than 25 parts by weight, a decrease in the rebound may occur.

Above component A is included in an amount, based on the total amount of the resin material in the cover stock, of at least 60 wt %, but not more than 90 wt %. The lower limit is preferably at least 70 wt %, and more preferably at least 75 wt %, and the upper limit is preferably not more than 88 wt %, and more preferably not more than 85 wt %. If component A is included in an amount of less than 60 wt %, a sufficient rebound may not be attainable. On the other hand, at more than 90 wt %, a soft feel on impact may not be attainable.

In the invention, 40 to 80 wt % of above component A is an ionomer obtained by neutralization with alkali metal ions, and preferably an ionomer obtained by neutralization with sodium ions. The content of ionomer obtained by neutralization with alkali metal ions is preferably 50 to 80 wt %, and especially 70 to 80 wt %. If the content of ionomer obtained by neutralization with alkali metal ions is less than 40 wt %, there is a considerable risk that component A will react with urethane during cover formation, giving rise to gelation. Conversely, if the content of ionomer obtained by neutralization with alkali metal ions is more than 80 wt %, the durability and rebound of the ball may decrease.

Next, the golf ball material of the invention includes, as component B, at least one type of olefin-unsaturated carboxylic acid copolymer and/or olefin-unsaturated carboxylic acid-unsaturated carboxylic acid ester copolymer having the same acid content as the unsaturated carboxylic acid content of component A.

The olefin, unsaturated carboxylic acid and unsaturated carboxylic acid ester used in component B may be the same as those mentioned above in the description of component A.

Also, the olefin-unsaturated carboxylic acid copolymer and/or olefin-unsaturated carboxylic acid-unsaturated carboxylic acid ester copolymer used in component B may be the same as the copolymer prior to metal neutralization in above component A.

To improve the durability and cover moldability, it is preferable for above component B to have an acid content which is the same as the unsaturated carboxylic acid content of above component A. For example, if the unsaturated carboxylic acid content (acid content) in an olefin-unsaturated carboxylic acid copolymer serving as component A is 15 wt %, the content of unsaturated carboxylic acid included within above component B will also be 15 wt %. Likewise, if the unsaturated carboxylic acid content (acid content) in an olefin-unsaturated carboxylic acid-unsaturated carboxylic acid ester copolymer as component A is 10 wt %, the content of unsaturated carboxylic acid (acid content) within component B will also be 10 wt %.

Illustrative examples of olefin-unsaturated carboxylic acid copolymers as component B include Nucrel 1560, Nucrel 1214 and Nucrel 1035 (all products of DuPont-Mitsui Polychemicals Co., Ltd.), and Escor 5200, Escor 5100 and Escor 5000 (all products of Exxon-Mobil Chemical). Illustrative examples of olefin-unsaturated carboxylic acid-unsaturated carboxylic acid ester copolymers include Nucrel AN 4311 and Nucrel AN 4318 (both products of DuPont-Mitsui Polychemicals Co., Ltd.), and Escor ATX325, Escor ATX320 and Escor ATX310 (all products of Exxon-Mobil Chemical).

The amount of above component B included, based on the overall amount of resin material in the cover stock, is at least 5 wt % but not more than 20 wt %, with the lower limit being preferably at least 7 wt %, and more preferably at least 8 wt %, and with the upper limit being preferably not more than 15 wt %, and more preferably not more than 12 wt %. If the amount of component B is less than 5 wt %, the heat resistance of the cover stock may fail to improve and the desired effects of the invention may be unattainable. Conversely, if the amount of component B is more than 20 wt %, it may not be possible to achieve a sufficient ball rebound.

For good compatibility with the thermoplastic polyurethane elastomer used as subsequently described component C, the melt index (MI) of component B is typically at least 10 dg/min, preferably at least 30 dg/min, and more preferably at least 60 dg/min.

The polyurethane elastomer serving as component C of the invention, although not subject to any particular limitation, is preferably a thermoplastic polyurethane elastomer, a polyurethane powder, or a thermoset polyurethane elastomer. The use of a thermoplastic polyurethane elastomer or a polyurethane powder is especially preferred.

The thermoplastic polyurethane elastomer which may be used in the invention has a structure composed in particular of a polymeric polyol compound that forms soft segments, a monomolecular chain extender that forms hard segments, and a diisocyanate.

Any polymeric polyol may be used without particular limitation. Suitable polymeric polyols include polyester polyols, polyether polyols, copolyester polyols and polycarbonate polyols. Examples of polyester polyols include polycaprolactone glycol, poly(ethylene-1,4-adipate) glycol and poly(butylene-1,4-adipate) glycol. Examples of copolyester polyols include poly(diethylene glycol adipate) glycol. Examples of polycarbonate polyols include (hexanediol-1,6-carbonate) glycol. Examples of polyether polyols include polyoxytetramethylene glycol. These polymeric polyol compounds have a number-average molecular weight of about 600 to 5,000, and preferably 1,000 to 3,000.

The diisocyanate used in the cover is preferably an aliphatic or aromatic diisocyanate. Specific examples include hexamethylene diisocyanate (HDI), 2,2,4- and 2,4,4-trimethylhexamethylene diisocyanate (TMDI), lysine diisocyanate (LDI), tolylene diisocyanate (TDI) and diphenylmethane diisocyanate (MDI). For good compatibility when blending with the other resins, the use of hexamethylene diisocyanate (HDI) or diphenylmethane diisocyanate (MDI) is especially preferred.

The monomolecular chain extender, which is not subject to any particular limitation, may be an ordinary polyhydric alcohol or polyamine. Specific examples include 1,4-butylene glycol, 1,2-ethylene glycol, 1,3-propylene glycol, 1,6-hexylene glycol, 1,3-butylene glycol, dicyclohexylmethylmethanediamine (hydrogenated MDI) and isophoronediamine (IPDA).

The above thermoplastic polyurethane elastomer has a JIS A hardness of typically 70 to 100, preferably 80 to 99, more preferably 85 to 99, and even more preferably 90 to 95. At a JIS A hardness of less than 70, the ball may take on excessive spin when hit with a driver, resulting in a shorter carry. No limitation is imposed on the specific gravity of the thermoplastic polyurethane elastomer, so long as it is suitably controlled within a range that allows the objects of the invention to be achieved. The specific gravity is preferably from 1.0 to 1.3, and more preferably from 1.1 to 1.25.

The above-described thermoplastic polyurethane elastomer may be a commercial product. Illustrative examples include Pandex T7298, Pandex EX7895, Pandex T7890, Pandex T8198 and Pandex T-R3080 (all manufactured by DIC Bayer Polymer, Ltd.).

Polyurethane powders that may be used in the invention include those composed of fine, spherical particles of polymer. In such microspherical polymers, the individual particles do not cohere to each other, allowing the powder to easily disperse within the base ionomer resin. These polymers can thus impart qualities intrinsic to polyurethanes, such as flexibility, toughness, scratch resistance and weather resistance, without compromising the properties of the cover stock. Moreover microspherical polymers have excellent flow properties and slipperiness, and are thus able to significantly improve moldability. Microspherical polymers suitable for use as the polyurethane powder have an average particle size of generally 0.1 to 100 m, preferably 0.5 to 60 m, more preferably 1 to 40 m, and most preferably 2 to 20 m. Examples of this type of polymer include the Art Pearl series produced by Negami Kogyo.

A cover stock composed primarily of a heated mixture of the above-described components A, B and C is thus used in the invention. The content of the heated mixture, based on the total weight of the cover stock, is generally at least 80 wt %, preferably at least 90 wt %, and more preferably at least 95 wt %.

To improve the feel of the ball at the time of impact, the cover stock composed primarily of a heated mixture of above components A, B and C may include also, in addition to the above essential components, various thermoplastic elastomers. Examples of such thermoplastic elastomers include olefin elastomers, styrene elastomers, polyester elastomers and polyamide elastomers. Of these, olefin elastomers and polyester elastomers are preferred, and olefin elastomers are especially preferred.

When the above thermoplastic elastomer is added, the amount of addition, per 100 parts by weight of the essential components, is typically 1 to 50 parts by weight, preferably 2 to 40 parts by weight, more preferably 3 to 25 parts by weight, and most preferably 4 to 10 parts by weight.

The method of preparing the above-described heated mixture is preferably one that involves pre-mixing above components B and C, and subsequently adding component A to give the heated mixture. This makes it possible to prevent a reaction between components A and C, and has the advantage of greatly improving moldability and heat resistance.

To obtain the above heated mixture, kneading can be carried out using any suitable mixing apparatus, such as a twin-screw extruder, a Banbury mixer or a kneader. When a twin-screw extruder is used, the heated mixture may be suitably obtained by first charging components B and C at a first feed port, then adding component A at a second feed port. In this case, as shown in FIG. 1, it is preferable for a zone which extends from the first feed port to just short of the second feed port to have a maximum temperature setting of 200 to 230° C., and for a zone which extends from the second feed port to a discharge opening to have a maximum temperature setting of 150 to 200° C. By setting the temperature at which above components B and C are mixed so as to be higher than the temperature during the subsequent addition of above component A, gelation can be better prevented from occurring during injection molding and the durability of the ball as a finished product can be improved.

The mixing time is preferably set within a range of 10 seconds to 5 minutes for both charging steps.

The above-described heated mixture is not subject to any particular limitation concerning the method for incorporating various additives and fillers, such as thermoplastic resins and thermoplastic elastomers other than essential components A, B and C, and titanium dioxide. Illustrative examples include a method in which such additives and fillers are incorporated with the above essential components and mixing under applied heat is carried out at the same time, and a method in which the essential components are first mixed under heating, following which the desired additives are added and further mixing under heating is carried out.

The above-described cover stock has a melt index of preferably 0.5 to 30 dg/10 min, preferably 1.0 to 10 dg/10 min, and most preferably 1.5 to 5 dg/min.

It is preferable that the cover stock not contain as essential components any amines or other organic base compounds that have a corrosive effect on the mold. Such organic base compounds are exemplified by hardened tallow alkyl amines and hardened tallow alkyl propylenediamines. The use of amines and other compounds which have a corrosive effect on the mold makes it impossible to ensure the safety of the production equipment. In the practice of the invention, although the cover stock contains no amines such as low-melting aliphatic amines, it has a good cover moldability and good adhesion with other, adjoining, cover layers. Hence, a decrease in the durability of the ball to impact can be prevented and a good paint film adhesion can be achieved.

Also, in the invention, at least one other cover layer adjoining the cover layer made of the above-described cover stock (first cover layer) is composed primarily of a non-ionomeric thermoplastic elastomer. This makes it possible to enhance adhesion or "sticking" between both cover layers. For example, in a golf ball having two cover layers, if the cover layer made of the above-described cover stock is on the outside, the inner cover layer can be made of the non-ionomeric thermoplastic elastomer. If the cover layer made of the above-described cover stock is on the inside, the outside cover layer can be made of the non-ionomeric thermoplastic elastomer.

Specific examples of the above non-ionomeric thermoplastic elastomer include olefin elastomers, styrene elastomers, polyester elastomers, polyurethane elastomers and polyamide elastomers. In particular, when polyurethane elastomers and polyester elastomers are used, one would expect adhesion with an adjoining cover layer made of ionomer or the like to decrease and durability to decrease. However, in the present invention, because one of the cover layers is formed primarily of the above-described heated mixture, even when it adjoins a cover layer formed using a polyurethane elastomer or a polyester elastomer, adhesion between the cover layers can be improved.

Also, in the present invention, a cover layer enclosing the above-described first cover layer can be formed of a polyurethane elastomer. From the standpoint of improving adhesion with the at least first cover layer, it is preferable for the polyurethane cover layer to include an isocyanate mixture.

"Isocyanate mixture" refers to a mixture obtained by dispersing (i) an isocyanate compound having as functional groups at least two isocyanate groups per molecule in (ii) a thermoplastic resin that is substantially non-reactive with isocyanate.

Isocyanate compounds used in the prior art relating to thermoplastic polyurethane materials can be suitably used here as the isocyanate compound (i). Illustrative, non-limiting, examples include aromatic diisocyanates such as 4,4'-diphenylmethane diisocyanate, 2,4-toluene diisocyanate and 2,6-toluene diisocyanate; and aliphatic diisocyanates such as hexamethylene diisocyanate. From the standpoint of reactivity and work safety, the use of 4,4'-diphenylmethane diisocyanate is preferred.

The thermoplastic resin (ii) is preferably selected from among resins having a low water absorption and excellent compatibility with thermoplastic polyurethane materials. Illustrative, non-limiting, examples of such resins include polystyrene resins, polyvinyl chloride resins, ABS resins, polycarbonate resins and polyester elastomers (e.g., polyether-ester block copolymers, polyester-ester block copolymers). From the standpoint of rebound resilience and strength, a polyester elastomer, and particularly a polyether-ester block copolymer, is preferred.

In the above isocyanate mixture, it is desirable for the relative proportions of the thermoplastic resin (ii) and the isocyanate compound (i), expressed as a weight ratio, to be from 100:5 to 100:100, and especially from 100:10 to 100:40. If the amount of the isocyanate compound (i) relative to the thermoplastic resin (ii) is too low, the crosslinking reaction with the polyurethane elastomer serving as component C will be inadequate, in addition to which the thermoplastic resin (ii) will exert a large influence, which may compromise the physical properties of the heated mixture of which the cover stock is primarily composed. On the other hand, if the amount of the isocyanate compound (i) is too large, component (i) may cause slippage to occur during mixing, making preparation of the isocyanate mixture difficult.

The isocyanate mixture can be prepared by blending the isocyanate compound (i) in the thermoplastic resin (ii) and thoroughly working together these components at a temperature of 130 to 250° C. using mixing rollers or a Banbury mixer, then either pelletizing or cooling and subsequently grinding. A commercial product such as Crossnate EM30

(made by Dainichi Seika Colour & Chemicals Mfg. Co., Ltd.) may be suitably used as the isocyanate mixture.

Component C is included in an amount, based on the total amount of resin materials in the cover stock, of at least 2 wt % but not more than 30 wt %. The lower limit is preferably at least 5 wt %, and more preferably at least 10 wt %, and the upper limit is preferably not more than 25 wt %, and more preferably not more than 20 wt %. If the amount of component C is less than 2 wt %, a soft feel on impact is not obtained. On the other hand, at more than 30 wt %, a good moldability is not achieved.

The golf ball of the invention may be, for example, a thread-wound golf ball in which the cover has a multilayer structure of two or more layers, a two-piece golf ball, a three-piece golf ball, or a multi-piece golf ball in which the cover has three or more layers.

In the inventive golf ball, the core may be a thread-wound core or a solid core, and can be manufactured by a conventional method. A solid core may be obtained by, for example, mixing 100 parts by weight of cis-1,4-polybutadiene with at least 10 parts by weight but not more than 60 parts by weight of one or a mixture of two or more vulcanizing agent (crosslinking agent) selected from among α,β-monoethylene unsaturated carboxylic acids such as acrylic acid or methacrylic acid, or metal ion neutralization products thereof, and functional monomers such as trimethylolpropane methacrylate; at least 5 parts by weight but not more than 30 parts by weight of a filler such as zinc oxide or barium sulfate; at least 0.5 part by weight but not more than 5 parts by weight of a peroxide such as dicumyl peroxide; and, if necessary, at least 0.1 part by weight but not more than 1 part by weight of an antioxidant so as to prepare a rubber composition. The rubber composition is then vulcanized (crosslinked) under applied pressure, and subsequently molded under heat and pressure into a spherical shape at a temperature of at least 140° C. but not more than 170° C. for a period of at least 10 minutes but not more than 40 minutes.

Production of a thread-wound golf ball core may be carried out by first creating a liquid or a solid center. In the case of a liquid center, a hollow spherical center envelope is typically formed from the above-described rubber composition, for example, after which the envelope is filled with a liquid by a method known to the art. If a solid center is used instead, the solid center may be produced by the solid core production method described above, following which rubber thread may be wound in a stretched state about the center to form the core.

Use may be made of rubber thread produced by a conventional method in which, for example, a rubber composition prepared by compounding natural rubber or synthetic rubber such as polyisoprene with various additives (e.g., antioxidants, vulcanization accelerators, sulfur) is extruded and vulcanized.

To obtain golf balls according to the invention using the various types of cores described above, use may be made of a method in which a cover having a plurality of layers is formed, such as a method in which a single-layer core or multi-layer core of two or more layers that has been prefabricated according to the type of ball to be manufactured is placed in a mold and the material of the invention is heated, mixed and melted, then injection molded over the core. In this case, the golf ball manufacturing operation can be carried out under conditions which ensure that the material has an excellent thermal stability, flow properties and moldability. The resulting golf ball has a high rebound.

The method used to produce the multi-layer cover is not limited to the method described above. For example, use may be made of a method in which first a pair of hemispherical half-cups is molded from the inventive cover stock, following which the half-cups are placed over a core and molded under pressure at 120 to 170° C. for 1 to 5 minutes.

No particular limitation is imposed on the thickness of the cover (total thickness of the plurality of layers), although generally the cover is formed to a thickness of at least 0.5 mm, preferably at least 0.9 mm, and more preferably at least 1.1 mm, but not more than 4.0 mm, preferably not more than 3.0 mm, and more preferably not more than 2.4 mm. The cover stock made of the heated mixture may be used either at the interior of the multilayer construction or may be used as the outermost layer of the cover. In golf balls having a cover of two or more layers, the cover stock made of the heated mixture may even be suitably used as a layer of the cover other than the outermost layer—that is, as an inner layer of the cover.

The specific gravity per layer of the foregoing cover, while not subject to any particular limitation, is generally at least 0.9, preferably at least 0.92, and more preferably at least 0.94, but generally not more than 1.2, preferably not more than 1.10, and more preferably not more than 1.05.

The surface of the outermost layer of the cover may have a plurality of dimples formed thereon, and the cover may be administered various treatment such as surface preparation, stamping and painting. In particular, the ease of operation involved in administering such surface treatment to a golf ball cover made of the inventive cover stock can be improved on account of good moldability of the cover surface.

In the golf balls manufactured as described above, the diameter, weight, hardness and other parameters of the cover, the solid or liquid center, the solid core or the thread-wound core, while not subject to any particular limitations, may be adjusted as appropriate, insofar as the objects of the invention are attainable.

The golf ball of the invention may be manufactured in accordance with the Rules of Golf for use in competitive play. That is, the ball may be produced to a diameter of at least 42.67 mm and a weight of not more than 45.93 g.

As described above, the present invention provides golf balls made using a cover stock composed primarily of a polyurethane/ionomer resin blend having a good thermal stability, flow and processability. The inventive golf ball exhibits a good adhesion between the cover layer made of the foregoing cover stock and an adjoining cover layer, in addition to which it exhibits excellent rebound and feel, and improved durability to impact.

EXAMPLES

The following Examples are provided by way of illustration and not by way of limitation. Numerical values for the respective materials shown in Tables 1 and 2 below indicate parts by weight.

Examples 1 to 4, Comparative Examples 1 to 5

The core materials shown in Table 1 below were used to obtain a core A having a diameter of 37.3 mm, a weight of 32.0 g, and a deflection of 3.1 mm under 100 kg of loading.

TABLE 1

| Ingredients | Core A | Core B |
|---|---|---|
| Polybutadiene rubber A | 100 | — |
| Polybutadiene rubber B | — | 100 |
| Barium sulfate | — | 20 |

TABLE 1-continued

| Ingredients | Core A | Core B |
|---|---|---|
| Zinc oxide | 20 | 5 |
| Zinc acrylate | 30 | 25 |
| Zinc salt of pentachlorothiophenol | 0.4 | 0.1 |
| Zinc stearate | 5 | — |
| Dicumyl peroxide | 0.6 | 1.2 |

Polybutadiene A: cis-1,4-Polybutadiene synthesized using a neodymium catalyst.
Polybutadiene B: cis-1,4-Polybutadiene synthesized using a nickel catalyst.

Next, in Examples 1 to 3 and Comparative Examples 1 to 3 and 5, preparation method a in the "Method of preparing intermediate layer material" row in Table 2 was used. That is, mixture of the cover inside layer (intermediate layer) material having the composition shown in Table 2 below was carried out with a twin-screw extruder (manufactured by IKG; L/D ratio, 30; screw diameter, 32 mm) by charging components B and C at a first feed port on the twin-screw extruder, and subsequently adding component A at a second feed port. The maximum temperature setting in a zone which extends from the first feed port to just short of the second feed port was 210° C. in each case, and the maximum temperature setting in a zone which extends from the second feed port to the discharge opening was 180° C. In Example 4 and Comparative Example 4, preparation method b in Table 2 was used. That is, a twin-screw extruder, components A, B and C were charged at the first feed port under maximum temperature settings of 210° C., both from the first feed port to the second feed port, and also from the second feed port to the discharge opening.

The resulting mixture was then injection molded into a mold in which the above-described core A had been placed, thereby giving a spherical body (diameter, 40.6 mm) composed of the core A enclosed by the cover inner layer (intermediate layer). Next, the spherical body was placed in another mold and a cover stock having the composition shown in Table 2 below was injection molded over the spherical body, thereby giving a golf ball having a diameter of 42.67 mm. Numerous dimples were formed at the same time in the cover surface by injection molding. In addition, a urethane coating was applied to a coat thickness of 20 m with an automatic spray gun. After coating, the ball was dried under heating at 50° C. for 2 hours, then held at room temperature for 16 hours, thereby completing the administration of a coat onto the surface of the cover.

Each golf ball was evaluated as described below for a number of properties. The results are given in Tables 2 and 3.
Shore D Hardness of Cover and Intermediate Layer (Cover Inner Layer)
The cover stock or intermediate layer material was formed into a 1 mm thick sheet whose hardness was the Shore D hardness as measured in accordance with ASTM D-2240.
Ball Hardness
The deflection of the ball (mm) when subjected to a load of 100 kg.
Initial Velocity
The initial velocity measured using an initial velocity measuring apparatus of the same type as that of the R&A (USGA)—the official golf ball regulating body, and in accordance with the rules of the R&A (USGA).
Melt Index (MI) of Intermediate Layer Material
The melt index (MI) of the material measured in accordance with JIS-K7210 (test temperature, 190° C.; test load, 21 N (2.16 kgf)). To determine the melt index of material that remained in a heated state (retained material), measurement was carried out under the same conditions on a sample that was heated at 230° C. for 10 minutes.
Durability
Using a coefficient of restitution (COR) measurement device, the golf ball was repeatedly hit at an incident velocity of 50 m/s, and the number of times the ball was hit until it failed was determined. The results shown in Table 2 are relative values based on an arbitrary score of 100 for Comparative Example 1, and the results shown in Table 3 are relative values based on an arbitrary score of 100 for Comparative Example 6.

TABLE 2

| | | | Example | | | | Comparative Example | | | | |
|---|---|---|---|---|---|---|---|---|---|---|---|
| | | | 1 | 2 | 3 | 4 | 1 | 2 | 3 | 4 | 5 |
| Core | | | A | A | A | A | A | A | A | A | A |
| Intermediate layer material formulation | (A) | Himilan 1605 | 42.5 | 40 | 35 | 40 | 47.5 | 45 | 45 | 50 | 30 |
| | | Himilan 1706 | 42.5 | 40 | 35 | 40 | 47.5 | 45 | 45 | 50 | 30 |
| | (B) | Nucrel 1560 | 10 | 10 | 10 | 10 | | | | | 30 |
| | (C) | Pandex T-R3080 | 5 | 10 | 20 | 10 | 5 | 10 | 10 | | 10 |
| | | Amine ABT | | | | | | 3 | 3 | | |
| Method of preparing intermediate layer material | | | a | a | a | b | a | a | a | b | a |
| Intermediate layer material properties | MI (g/10 min) | | 4.0 | 4.2 | 4.6 | 4.2 | 3.0 | 3.3 | 1.7 | 1.5 | 5.0 |
| | MI (retained material) (g/10 min) | | 3.9 | 4.0 | 4.4 | 3.8 | 2.5 | 2.7 | 1.2 | 1.5 | 4.0 |
| | Shore D hardness | | 60 | 59 | 57 | 59 | 61 | 60 | 61 | 63 | 56 |
| Cover stock | Pandex T-8295 | | 100 | 100 | 100 | 100 | 100 | 100 | 100 | 100 | 100 |
| | Crossnate EM-30 | | 15 | 15 | 15 | 15 | 15 | 15 | 15 | 15 | 15 |
| | Titanium dioxide | | 2 | 2 | 2 | 2 | 2 | 2 | 2 | 2 | 2 |
| Ball hardness | | | 2.5 | 2.6 | 2.7 | 2.6 | 2.5 | 2.5 | 2.5 | 2.3 | 2.8 |
| Ball weight | | | 45.1 | 45.2 | 45.3 | 45.2 | 45.1 | 45.2 | 45.2 | 45.1 | 45.4 |
| Initial velocity | | | 77.2 | 77.2 | 77.1 | 77.2 | 77.2 | 77.1 | 77.0 | 77.2 | 76.9 |
| Durability | | | 162 | 144 | 122 | 102 | 100 | 98 | 88 | 21 | 155 |

Trade names and materials mentioned in the table are described below.

Himilan 1605: A sodium ion neutralization product of an ethylene-methacrylic acid copolymer produced by DuPont-Mitsui Polychemicals Co., Ltd.

Himilan 1706: A zinc ion neutralization product of an ethylene-methacrylic acid copolymer produced by DuPont-Mitsui Polychemicals Co., Ltd.

Nucrel 1560: An ethylene-methacrylic acid copolymer produced by DuPont-Mitsui Polychemicals Co., Ltd.

Pandex T-R3080: A thermoplastic polyurethane elastomer produced by DIC Bayer Polymer, Ltd.
Pandex T-8295: A thermoplastic polyurethane elastomer produced by DIC Bayer Polymer, Ltd.
Amine ABT: A hardened tallow alkyl amine produced by NOF Corporation.

Examples 5 to 8, Comparative Examples 6 to 10

The core materials shown in Table 1 were used to obtain a core B having a diameter of 35.3 mm, a weight of 27.1 g, and a deflection of 4.0 mm under 100 kg of loading. Next, an intermediate layer material (thermoplastic polyester elastomer) of the composition shown in Table 3 below was injection molded into a mold in which core B had been placed, thereby giving a spherical body (diameter, 38.6 mm; weight, 35.3 g; deflection under 100 kg of loading, 3.9 mm) composed of core B enclosed within the intermediate layer.

In Examples 5 to 7 and Comparative Examples 6 to 9, preparation method a in the "Method of preparing cover stock" row in Table 3 was used. That is, mixture of the cover stock having the composition shown in Table 3 below was carried out with a twin-screw extruder (manufactured by IKG) by charging components B and C at a first feed port on the twin-screw extruder, and subsequently adding component A at a second feed port. The maximum temperature setting in a zone which extends from the first feed port to just short of the second feed port was 210° C. in each case, and the maximum temperature setting in a zone which extends from the second feed port to the discharge opening was 180° C. In Example 8 and Comparative Example 10, preparation method b in the table was used. That is, using a twin-screw extruder, components A, B and C were charged at the first feed port under maximum temperature settings of 210° C., both from the first feed port to the second feed port, and also from the second feed port to the discharge opening. The resulting mixture was then injection molded into a mold in which the above-described spherical body had been placed, thereby giving a golf ball having a diameter of 42.67 mm. Numerous dimples were formed at the same time on the surface of the cover by injection molding.

Trade names and materials mentioned in the table are described below. Explanations of trade names identical with those in Table 2 are omitted here.

Himilan 1601: A sodium ion-neutralized ionomer of an ethylene-methacrylic acid copolymer produced by DuPont-Mitsui Polychemicals Co., Ltd.
Himilan 1557: A zinc ion-neutralized ionomer of an ethylene-methacrylic acid copolymer produced by DuPont-Mitsui Polychemicals Co., Ltd.
Himilan 1554: A zinc ion-neutralized ionomer of an ethylene-methacrylic acid copolymer produced by DuPont-Mitsui Polychemicals Co., Ltd.
Hytrel 4047: A thermoplastic polyester elastomer produced by DuPont-Toray Co., Ltd.

The invention claimed is:

1. A method of manufacturing a golf ball composed of a core and a cover having a plurality of layers that encloses the core, at least a first layer of the cover being formed primarily of a heated mixture of:
   (A) 60 to 90 wt % of a metal ion neutralization product of an olefin-unsaturated carboxylic acid copolymer and/or a metal ion neutralization product of an olefin-unsaturated carboxylic acid-unsaturated carboxylic acid ester copolymer (40 to 80 wt % of component A being an ionomer neutralized with alkali metal ions),
   (B) 5 to 20 wt % of at least one type of olefin-unsaturated carboxylic acid copolymer and/or olefin-unsaturated carboxylic acid-unsaturated carboxylic acid ester copolymer having the same unsaturated carboxylic acid content as component A, and
   (C) 2 to 30 wt % of a thermoplastic polyurethane elastomer, the method being comprised of pre-mixing component B and component C, and subsequently adding component A and forming the mixture into the layer of the golf ball.

2. The golf ball manufacturing method of claim 1, wherein components B and C are mixed at a temperature that is set higher than the temperature in the subsequent addition of component A.

3. The golf ball manufacturing method of claim 1, wherein a twin-screw extruder is used during preparation of the heated mixture and the heated mixture is obtained by charging com-

TABLE 3

| | | Example | | | | Comparative Example | | | | |
|---|---|---|---|---|---|---|---|---|---|---|
| | | 5 | 6 | 7 | 8 | 6 | 7 | 8 | 9 | 10 |
| Core | | B | B | B | B | B | B | B | B | B |
| Inte. layer | Hytrel 4047 | 100 | 100 | 100 | 100 | 100 | 100 | 100 | 100 | 100 |
| Cover stock formulation | (A) Himilan 1605 | 42.5 | 40 | 60 | 42.5 | 45 | 47.5 | 45 | 50 | |
| | Himilan 1601 | | | | | | | | 50 | 50 |
| | Himilan 1557 | | | | | | | | | 50 |
| | Himilan 1554 | 42.5 | 40 | 20 | 42.5 | 45 | 47.5 | 45 | | |
| | (B) Nucrel 1035 | 10 | 15 | 15 | 10 | | | | 10 | |
| | (C) Pandex T-R3080 | 5 | 5 | 5 | 5 | 10 | 5 | 10 | 5 | |
| | Amine ABT | | | | | 3 | 3 | | | |
| | Titanium dioxide | 2 | 2 | 2 | 2 | 2 | 2 | 2 | 2 | 2 |
| Method of preparing cover stock | | a | a | a | b | a | a | a | a | b |
| Cover stock properties | MI (g/10 min) | 4.2 | 4.4 | 4.8 | 4.4 | 3.3 | 3.0 | 1.5 | 4.3 | 2.1 |
| | MI (retained material) (g/10 min) | 4.1 | 4.2 | 4.8 | 4.0 | 2.7 | 2.5 | 0.8 | 4.3 | 2.1 |
| | Shore D hardness | 59 | 59 | 60 | 59 | 60 | 61 | 60 | 59 | 60 |
| | Ball hardness | 3.3 | 3.3 | 3.2 | 3.3 | 3.2 | 3.1 | 3.2 | 3.3 | 3.2 |
| | Ball weight | 45.2 | 45.2 | 45.2 | 45.2 | 45.2 | 45.2 | 45.2 | 45.2 | 45.1 |
| Initial velocity | | 77.2 | 77.2 | 77.2 | 77.1 | 77.1 | 77.1 | 77.1 | 77.1 | 76.9 |
| Durability | | 185 | 156 | 160 | 127 | 100 | 86 | 17 | 110 | 95 | ponents B and C at a first feed port on the extruder, then adding component A at a second feed port.

4. The golf ball manufacturing method of claim 3, wherein a zone which extends from the first feed port to just short of the second feed port has a maximum temperature setting of 200 to 230° C., and a zone which extends from the second feed port to a discharge opening has a maximum temperature setting of 150 to 200° C.

* * * * *